Patented Dec. 13, 1949

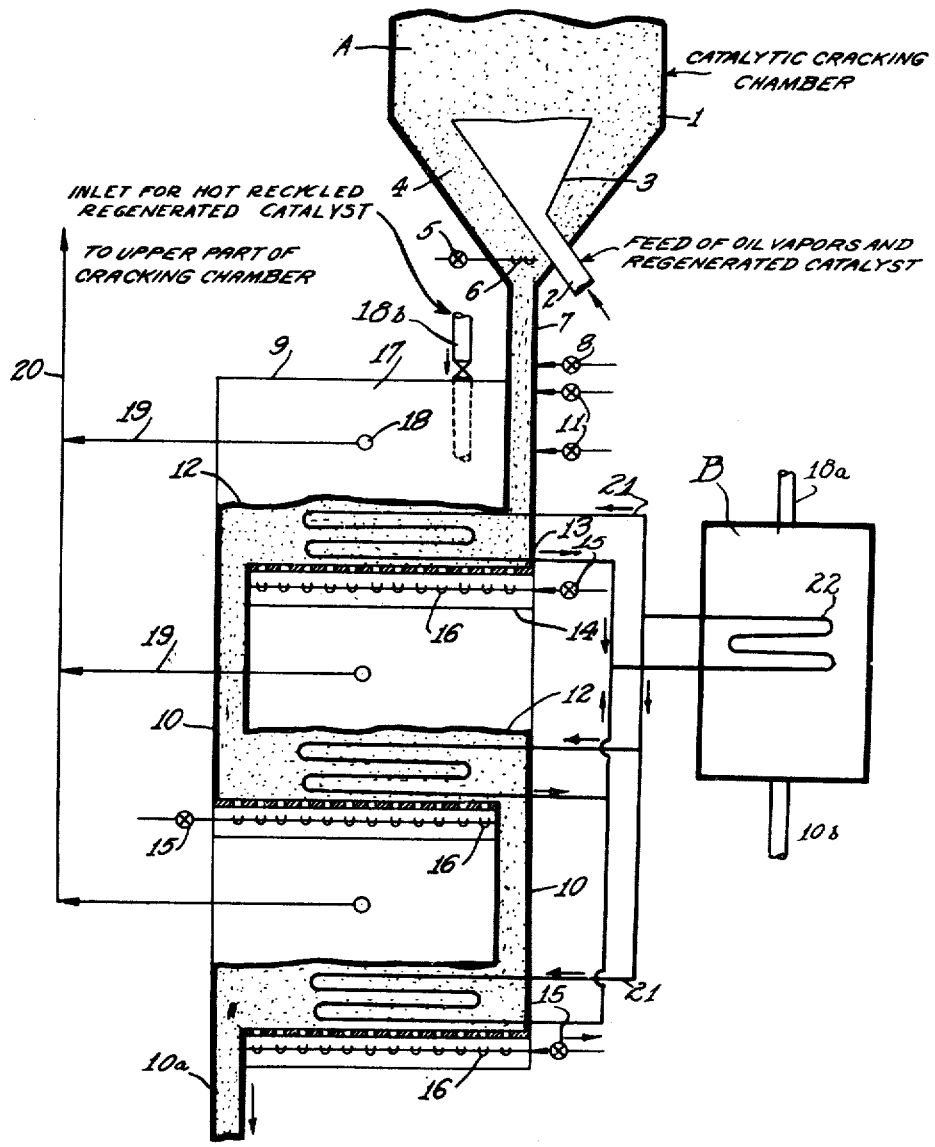

2,490,993

UNITED STATES PATENT OFFICE 2,490,993

CATALYST STRIPPING

Walter H. Borcherding, New York, N. Y., assignor to The M. W. Kellogg Company, Jersey City, N. J., a corporation of Delaware Application May 29, 1944, Serial No. 537,937

4 Claims. (Cl. 196—52)

In its specific aspects, the present invention pertains to improvements in processes for the catalytic conversion of hydrocarbons by a cyclic procedure. Such processes are represented by those presently commercially practiced for the cracking of high boiling hydrocarbons to gasoline, and analogous conversions by the so-called "fluid catalyst" procedure.

In the latter type of operation finely divided or powdered particles of catalytic material are successively and cyclically circulated through a conversion and regeneration zone. In the conversion zone, the particles of catalyst are contacted with the hydrocarbons undergoing cracking or other conversion reactions, at an elevated temperature and for a period of time sufficient to bring about the desired catalytic conversion, and which also results in the formation of a deposit of carbonaceous material on the catalyst of complex composition including both carbon and hydrogen. Upon separation and withdrawal from the vapors undergoing conversion, the used catalyst is passed to a regeneration zone and contacted therein with an oxygen-containing gas under suitable conditions to remove the carbonaceous deposit by combustion without detrimentally effecting the catalytic activity of the catalyst particles by overheating.

During the transfer of the used catalyst between the conversion and regeneration zone, it is customary to subject it to a purging treatment with an inert gas, such as steam or the like, to reduce the quantity of carbonaceous material present on the catalyst particles upon introduction to the regeneration zone, and the provision of improvements in the mode of operation and efficiency of the purging treatment is a primary object of this invention.

Heretofore, the method proposed for purging the finely divided catalyst, for example that described in Belchetz Patent No. 2,353,486, generally involved simple countercurrent flow of the used catalyst particles and the purging gas. Pursuant to the latter procedure, the used catalyst particles are permitted to fall through a vertical purging column in contact with an upwardly flowing stream of the purging medium. In this manner the used catalyst particles during their flow downwardly through the column are contacted with a stream of purging gas of constantly increasing purity from the standpoint of the concentration of purgable material therein. From theoretical standpoints, it has heretofore advisedly been considered by those skilled in the art that this type of purging treatment should provide optimum results.

Contrary to the foregoing the present invention is based upon the discovery that substantially improved results may be attained by a modified form of operation which departs radically from the simple countercurrent flow type of operation heretofore proposed and used.

In accordance with the process provided by this invention the catalyst particles while at the elevated temperature to which they are heated in the conversion step are flowed as a fluid mass in a generally horizontal direction at a plurality of successively lower horizontal levels. Transfer of the catalyst particles downward between these successive levels is provided by gravity flow. At each of the successive horizontal levels a purging medium is passed upwardly through the flowing mass of catalyst particles in quantity sufficient to maintain the fluid flowable condition of the mass and to purge the catalyst particles of vaporizable carbonaceous material entrained from the conversion zone and in addition similar material evolved during the prolonged period of flow of the hot catalyst through said plurality of levels. Further features and advantages of my invention will be apparent from the following detailed description thereof, given with reference to the appended drawing showing diagrammatically a vertical sectional elevation of a suitable form of apparatus for its practice.

In the figure numeral 1 indicates the lower portion of a chamber for catalytic cracking of the "fluid catalyst" type, in combination with a suitable form of apparatus for effecting the purging operation pursuant to this invention.

The cracking chamber illustrated is of the type wherein the powdered catalyst is both supplied and withdrawn from the lower portion of the cracking chamber, this type being regarded as preferable. The process, however, is also applicable to those cracking conversion systems wherein both the used powdered catalyst and reaction vapors are withdrawn overhead from the conversion chamber.

In the type illustrated a suspension of the high-boiling hydrocarbon vapors undergo treatment, and fresh or regenerated catalyst is supplied through transfer line 2 to a suitable distributing means such as a cone 3. The quantity of vapors and catalyst supplied is such as to produce a relatively dense turbulent fluidized phase of the catalyst in the cracking chamber indicated by A. The hydrocarbon vapors pass upwardly through the dense catalyst phase and during their contact therewith undergo the desired conversion reaction. Due to the extensive turbulence and internal recycle of the catalyst particles produced under these conditions, the catalyst is of substantial uniform composition throughout the dense phase, and may be suitably withdrawn from any point therein by gravity flow even from a lower portion thereof closely adjacent the incoming feed vapors by circular outlet passage 4 concentric to cone 3, as illustrated. The catalyst is maintained in a fluid condition while flowing through passage 4 by a suitable aerating medium supplied through valved line 5 and the associated distributor 6. From passageway 4, the catalyst is withdrawn through a suitable standpipe 7 in which the catalyst likewise may be maintained in a fluid flowable state by means of aerating fluid supplied through valved line 8. Heretofore it has been the practice to depend upon the simple countercurrent stripping reaction effected by stripping means such as lines 5 and 8 to effect the desired purging of the used catalyst.

Pursuant to the present process the used catalyst is passed to stripper tower 9 by gravity flow as shown, or otherwise, and is then passed through the tower in an elongated circuitous path in which it is maintained in a relatively dense but fluid state throughout. In its passage by gravity flow through the downflow pipes 10, the catalyst may be maintained in a free-flowing state by an aerating and purging medium supplied through valved lines 11. In certain instances the desired free-flowing condition in the downflow pipes may be produced without the provision of separate aerating means at these points. In general, it is contemplated that the catalyst present in the downflow pipes 10 will be maintained at a density substantially higher than the density maintained during its horizontal or lateral flow.

On its discharge from the lower end of pipe 10 the powdered catalyst displaces a corresponding amount of the catalyst present in the horizontal bed 12 and is thus caused to flow laterally over the perforated partition 13. Between the perforated partition 13 and the solid partition 14, suitable means are provided for injecting a controlled quantity of a suitable purging fluid heated to an elevated temperature such as steam, consisting of valved line 15 and the associated distributing means 16. The purging fluid is supplied through the latter means in quantity at least sufficient to maintain the catalyst thereabove in a free-flowing condition and to effect the desired purging of the carbonaceous contaminants. The gaseous mixture of purging medium and purged material is withdrawn from the upper portion of the space 17 above the horizontal bed through outlet 18 and pipe 19. After its passage over the first horizontal partition, the partially purged catalyst passes downwardly by gravity flow through a pipe 10 similar to the first, and is subjected to a similar purging treatment in the second stage, in which the structural elements are identical with those utilized in the first stage and require no further description. From the second stage the purging medium and purged products are withdrawn through another line 19, and suitably are passed to outlet manifold 20. Manifold line 20 suitably discharges into the upper part of reactor 1 into the upper light dispersed phase of catalyst therein which is maintained above dense phase A whereby the purged products and catalyst incidentally suspended in the purging medium are recovered. The number of stages of horizontal flow may be varied dependent upon the particular circumstances, a sufficient number being provided to effect the desired degree of purging within economical limits.

From the lowermost purging treatment, the purged catalyst is continuously conveyed by lines 10a and 10b to a suitable regenerator indicated diagrammatically at B, and then returned through line 2 thus completing the cyclic operation.

Various modifications in the apparatus and process flow illustrated in Figure 1 may be employed. Pursuant to one modification, in place of flowing the purging medium through the plurality of horizontal levels in a parallel arrangement as shown, a single source of purging medium may be provided below the lowermost horizontal partition and the purging medium thus passed serially upward through each of the horizontal partitions successively. In the latter case, partition 14 on the upper levels are of course omitted to permit the desired flow.

In place of employing perforated metal partitions for the purpose of distributing the purging medium, other types of distributing means may be employed as, for example, plates with bubble caps similar to those conventionally used in liquid vapor fractionating towers, or porous ceramic plates.

While the invention is not confined to any particular theory of operation, the improved and unexpected results secured compared to those produced by simple countercurrent stripping which theoretically would be the optimum procedure, are believed to be due to several factors. One of these is the prolonged residence time of the catalyst particles in passing through the stripping section which permits extensive decomposition of the carbonaceous deposit adsorbed on the surface of the hot catalyst. In addition, the catalyst particles are apparently presented in a physical state of aggregation by the present procedure which lends itself to more efficient stripping than the simple countercurrent procedure used heretofore. In order to enhance the first effect the purging fluid is preferably supplied in a heated condition and preferably at a temperature at least as high as the temperature of the catalyst upon withdrawal from the conversion zone, and in addition the stripping tower should be adequately heat insulated. As withdrawn from a cracking operation, the catalyst particles normally will be at a temperature of about 850–950° F., and as withdrawn from the regeneration operation at a temperature of about 1000–1100° F. In order to supply additional heat to the used catalyst during the stripping period, a stream of the hot regenerated catalyst pursuant to an advantageous modification of the invention may be recycled directly from the regeneration zone to the uppermost stripping level through valved line 18b and line 18a and admixed with the incoming used catalyst. The cooling of the recycled catalyst stream thus involved and its eventual return to the regeneration zone serves to maintain the reaction temperature of the latter within desired limits. Similarly, heat may be thus supplied and derived from the regeneration zone B by providing heat exchange coils 21 in the beds of catalyst at each level interconnected with a coil or coils 22 disposed in the regeneration zone, and circulating a heat exchange medium such as molten salt through the connected coils.

I claim:

1. In a method of catalytically converting high-boiling hydrocarbons wherein a catalyst in finely divided condition is contacted in a conversion zone with vapors of the hydrocarbons undergoing cracking at elevated temperatures for a period of time sufficient to effect the desired cracking reaction and resulting in the formation of a carbonaceous deposit on the catalyst particles, and thereafter contacting the used catalyst with an oxygen-containing gas in a regeneration zone to burn off the carbonaceous deposit and adapt the catalyst for reuse in the cracking step, the improvement which comprises: withdrawing hot used catalyst particles from said cracking step and flowing a fluid mass thereof in a generally horizontal direction at a plurality of successively lower horizontal levels, introducing at each of said levels a separate stream of an inert purging gas to pass upwardly through the flowing mass of catalyst particles to maintain the fluid flowable condition and to purge the catalyst particles of vaporizable material entrained from the conversion zone and similar material evolved during the prolonged period of flow of hot catalyst through said plurality of levels, introducing into the mass of used catalyst particles passing through the purging zone a stream of hot regenerated catalyst from the regeneration zone for simultaneous passage with said used catalyst through the purging zone, and transferring the mixture of used and regenerated catalysts downwardly between said successively lower levels by gravity flow, said fluid mass of catalyst particles being removed from said upwardly moving streams of purging gas in passing between said levels.

2. A process as defined in claim 1 wherein at least a portion of the stream of purging gas and vaporizable material is removed at each of said levels in a parallel flow procedure.

3. A process as defined in claim 1 wherein a common path extending upwardly through said levels is provided for said streams of purging gas and vaporizable material in a serial flow procedure.

4. A process as defined in claim 1 wherein additional heat is supplied to the catalyst during its flow through said purging zone by means of a heat exchange medium in indirect heat exchange with both the regeneration zone and the purging zone.

WALTER H. BORCHERDING.

REFERENCES CITED

The following references are of record in the file of this patent:

UNITED STATES PATENTS

| Number | Name | Date |
|--------|------|------|
| 2,270,903 | Rudbach | Jan. 27, 1942 |
| 2,289,329 | Prickett | July 7, 1942 |
| 2,302,209 | Goddin, Jr. | Nov. 17, 1942 |
| 2,304,128 | Thomas | Dec. 8, 1942 |
| 2,341,193 | Scheineman | Feb. 8, 1944 |
| 2,345,718 | Walton | Apr. 4, 1944 |
| 2,367,694 | Snuggs | Jan. 23, 1945 |
| 2,370,816 | Schonberg | Mar. 6, 1945 |
| 2,420,632 | Tyson | May 13, 1947 |

FOREIGN PATENTS

| Number | Country | Date |
|--------|---------|------|
| 543,838 | Great Britain | Mar. 16, 1942 |